April 9, 1935.　　　F. J. LEJBOWICZ　　　1,997,526
LOCKING DEVICE
Filed Oct. 21, 1931　　　3 Sheets-Sheet 1
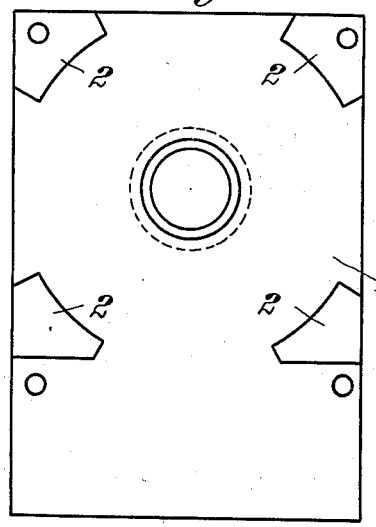
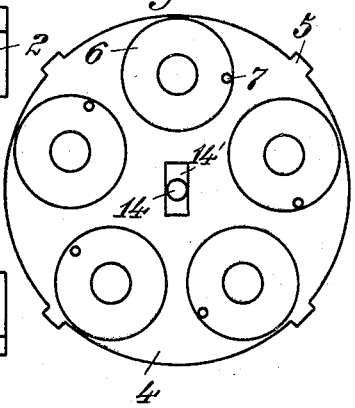
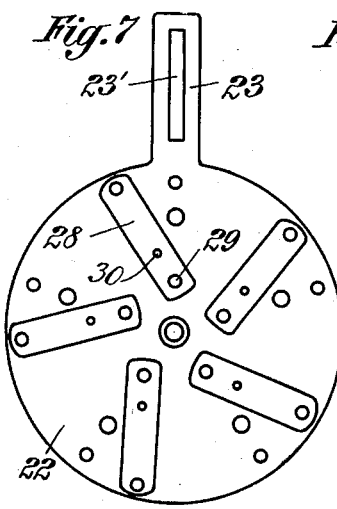
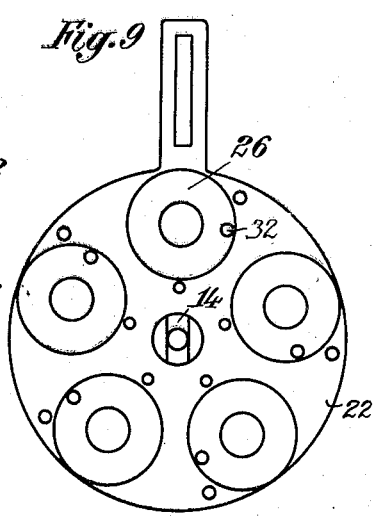
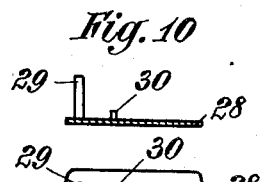
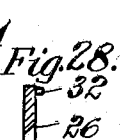
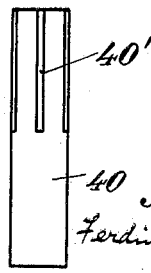
Inventor:
Ferdinand J. Lejbowicz
by Richard E. Babcock
Attorney April 9, 1935.  F. J. LEJBOWICZ  1,997,526
LOCKING DEVICE
Filed Oct. 21, 1931  3 Sheets-Sheet 2
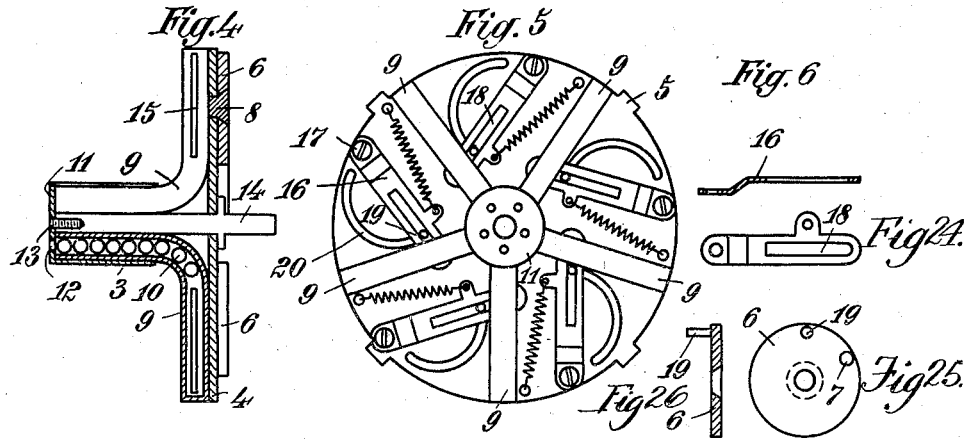
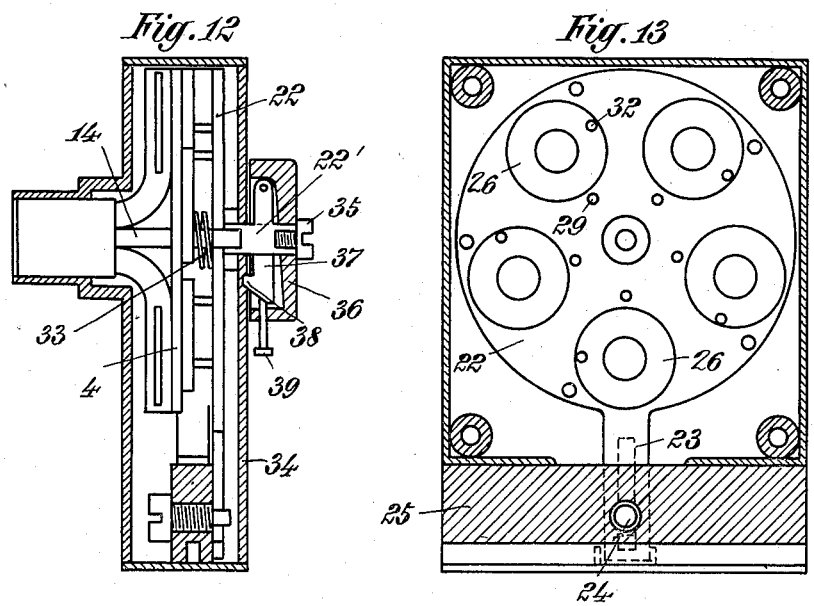
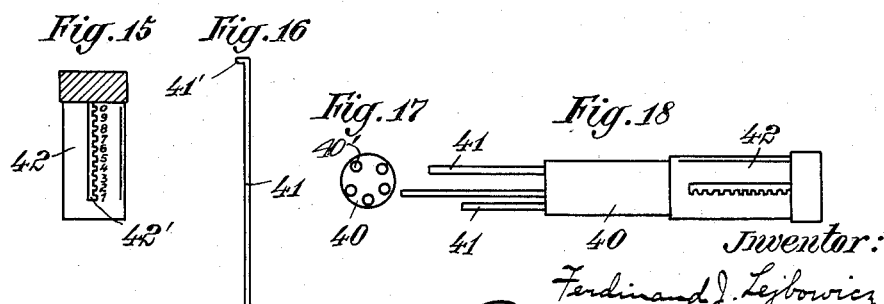

April 9, 1935.  F. J. LEJBOWICZ  1,997,526
LOCKING DEVICE
Filed Oct. 21, 1931  3 Sheets-Sheet 3

Inventor:
Ferdinand J. Lejbowicz
by Richard E. Babcock
Attorney

Patented Apr. 9, 1935

1,997,526

UNITED STATES PATENT OFFICE 1,997,526

LOCKING DEVICE

Ferdinand Josef Lejbowicz, Krolewska Huta, Poland

Application October 21, 1931, Serial No. 570,231
In Poland October 22, 1930

8 Claims. (Cl. 70—70)

The invention relates to locking devices such as can be locked by means of a key having adjustable bits but opened by means of the key only after its bits have been adjusted to correspond exactly to the position of the bits at the act of locking.

The main object of the invention is to provide a device comprising a pair of plates the distance apart of which can be varied, which plates in their distant position cause the bolt to be locked, while in their approached position they allow the bolt to be released.

Another object of the invention is to provide on the said plates distance pieces which can be rendered inoperative by means of the key, so as then to permit the approach of the plates to each other.

A still further object of the invention is to provide on the plates opposite one another, drivers for supporting the said distance pieces and coupled in pairs in the approached position of the plates for simultaneous displacement.

Other inventive features of the novel adjustable locking device, particularly advantageous embodiments of the plates the distance of which can be varied, of the distance pieces securing the locking position of the said plates, of the drivers, of the key, etc., will be obvious from the drawings which show the invention in various embodiments.

Figs. 1 to 18 show an embodiment of the novel locking device in which the plates variable in their distance from each other are revoluble, one of the plates engaging with the bolt. In the drawings Fig. 1 is a plan view of the front wall of the locking device as seen from within.

Fig. 2 is a longitudinal section of the front wall of the casing of the locking device as shown in Fig. 1.

Fig. 3 is a plan view of the plate which can be moved so as to vary its distance from a second plate, viz. the plate the drivers of which are influenced by the bits of the key, this view being taken as seen from behind.

Fig. 4 is a vertical section of the plate shown in Fig. 3. The figure also shows the guide tubes bearing against the plate at its front.

Fig. 5 is a front elevation corresponding to Figs. 3 and 4.

Fig. 6 is a side view of one of the levers such as are pivotally mounted on the plate shown in Fig. 3.

Fig. 7 is a rear view of the other or stationary plate belonging to the pair of plates.

Fig. 8 is a vertical section of the plate shown in Fig. 7.

Fig. 9 is a front elevation of the plate shown in Figs. 7 and 8.

Fig. 10 is a side view of one of the flat springs mounted on the rear side of the plate shown in Fig. 7.

Fig. 11 is a plan view of one of the drivers such as are mounted on the front side of the plate shown in Figs. 7 to 9.

Fig. 12 is a section taken through the locking device wherein certain details have been omitted for clearness.

Fig. 13 shows the locking device shown in Fig. 12 from within partly in section the plate arranged on the side of the keyhole and the corresponding cover of the lock casing having been previously removed.

Figs. 14 to 18 show an embodiment of the key and of its details.

Fig. 24 is a plan view of the lever shown in Fig. 6.

Fig. 25 is a plan view of one of the drivers mounted on the plate shown in Fig. 3.

Fig. 26 is a side view of the driver shown in Fig. 25.

Fig. 27 is a plan view of the flat spring shown in Fig. 10.

Fig. 28 is a section taken through the driver shown in Fig. 11.

Figures 20, 21:
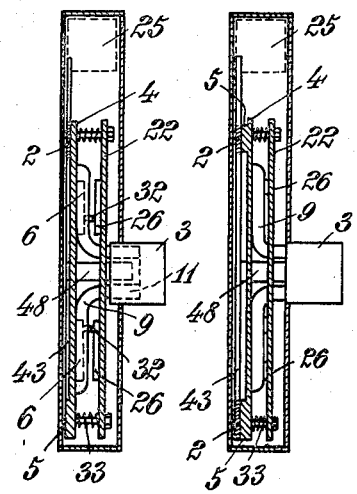
Fig. 20 is a lateral view, partly in section, of the locking device shown in Fig. 19, showing somewhat diagrammatically the plates withdrawn from each other.
Fig. 21 is a similar view with the plates at minimum distance.
Figure 23:
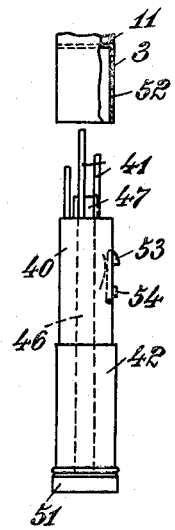
Fig. 23 shows a key the construction of which differs from that of the embodiments shown in Figs. 14 to 18.

The main feature of the novel locking device consists in the fact that two plates 4 and 22, the distance apart of which may be varied, will lock the bolt 25 or the rocking arm 23 or 43, which moves the said bolt respectively, when the said plates are in their withdrawn position (Figs. 12 and 20), but will release the bolt for movement when in their position of approach (Fig. 21).

In order to obtain the necessary withdrawn position of the two plates as well as their position of approach it suffices to render movable only one of the two plates, for example the plate 4, such being the case in both embodiments shown in the drawings. The plates 4 and 22 are under the action of springs 33 tending to move the said plates from each other. In the case of the embodiments shown in the drawings, after withdrawal of the plate 4 the plates lock the bolt and the rocking arm operating the said bolt indirectly by stops 2 and 5, in the embodiment shown in Figs. 1 to 18 the stops 2 being arranged on the front wall of the lock casing 1 provided with the keyhole and the stops 5 on the plate 4 whereas in the case of the embodiment shown in Figs. 19 to 23 the stops 2 are mounted on the special rocking arm 43 intended for displacing the bolt 25. When the bolt 25 is in its projected position the plates 4 and 22 are in their withdrawn position. The distance of the displaceable plate 4 from the locking casing 1 or from the rocking arm 43 respectively then is such as will cause the stops 5 of the plate 4 to engage the stops 2 of the lock casing 1 or of the rocking arm 43 respectively (Fig. 20) in a manner which prevents to rotate the plate 4 in the direction necessary for the retraction of the bolt. When, however, in order to unlock the locking device the plate 4, by means of the authorized key, has been moved towards the plate 22, the stops 5 mounted on the plate 4 will be lifted off the plane of the stops 2 (Fig. 21) so that the stops 2 and 5 may move past each other and at the same time release the bolt 25 for displacement. In order that the plates 4 and 22 are secured in the withdrawn position maintaining the bolt 25 and the rocking arm 43 respectively in the locked position, the said plates are provided with distance pieces which are rendered inoperative only in definite positions produced by unlocking with the aid of the authorized key and so permit the movement of the bolt 25 or of the rocking arm 43 respectively. In the two embodiments shown the distance pieces comprise pins 32 provided on special drivers 26 mounted on the plate 22 which pins are rendered inoperative only in definite positions by penetrating into corresponding recesses 7 provided in drivers 6 mounted on the opposite plate 4. The drivers 6 and 26 which may be arranged in any suitable number on the plates 4 and 22 respectively and are provided in pairs, comprise revoluble discs, as shown, which in the approached position of the plate 4 are coupled together by pairs by means of the distance pieces 32 and recesses 7 engaging with each other. It is obvious that the drivers may have any other suitable shape.

When the plate 4 has been approached to the plate 22, the drivers 26 of plate 22 are moved exclusively by the corresponding drivers 6 of the plate 4, but when the plate 4 has been moved back the said drivers 26 are uncoupled and kept in their position which in the embodiments shown is effected by pins 30 carried by the flat springs 28 which pins yieldingly extend through corresponding holes of plate 22 into recesses of the drivers 6 acting as notches (Fig. 8). In order that in the approached position of the plates 4 and 22 the drivers 26 be released, the flat springs 28 carrying the locking pins 30 are also provided with other pins 20 adapted to extend through recesses of the plate 22. The drivers 26 cannot be turned until by approaching the plate 4 to the plate 22 the pressure of pins 44 on plate 4, Fig. 19 exerted on springs 28 press said springs back and withdraw pins 30 from drivers 26.

The drivers 6 of the plate 4 are moved by operation of the authorized key and after the said key having been removed they always are returned into their zero position under the action of the springs 21, unlike the drivers carried by the plate 22. The drivers 6 are turned into the position rendering the distance pieces 32 inoperative solely by the introduction of the authorized key which according to the invention is provided with a plurality of bits singly adjustable. In the case of the embodiments shown the key is provided with five bits to accord with the number of pairs of drivers which bits consist of pins 41 with bent ends 41'. The pins are placed in a shell 40 and separately displaceable in longitudinal slots 40' by means of the bent ends 41'. The shell 40 is enclosed by another outside shell 42 provided with longitudinal slots 42' so that by the two shells being turned in relation to each other the pins 41 may be clamped in any position desired in the notches of the slot 42'. It is obvious that the steps of the bits may be shaped, arranged and adjusted in any other suitable manner and be provided for in a larger or smaller number according to the number desired of different combinations.

According to the invention the opening intended for the introduction of the key consists in a bushing 3 in which are the ends of members engaging with the drivers 6 of the plate 4 and transmitting the movement of the various bits to the drivers 6. For instance the said members may comprise flexible pressure pieces. In the case of the embodiments shown these transmitting members are balls 10 housed in guide tubes 9. The guides 9 begin at an intermediary disc 11 provided with corresponding holes 12. The ends of the guide tubes bearing against the plate 4 are provided with slots 15 with which engage according to Fig. 5 the ends of the levers 16 pivotally mounted on the fulcrum pins 17 which levers are coupled with the drivers by means of pins 19 mounted on the latter, penetrating into a slot 18 of the levers 16 and displaceable within a curved slot 20 of the plate 4.

Figure 19:
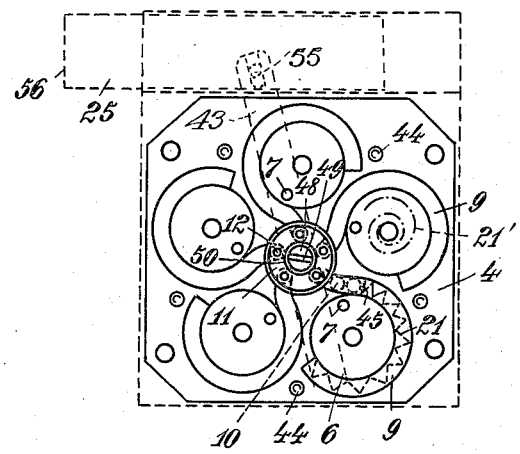
Fig. 19 is a plan view of the movable plate of a modified embodiment of the locking device, in which the plate is secured against rotation, the outlines of the casing, the bolt and the arm by means of which the bolt is moved being shown by dotted lines.
Figure 22:
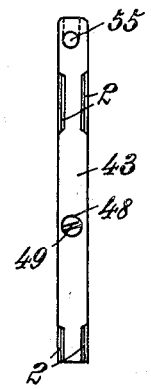
Fig. 22 is a detail view of an embodiment of the rocking arm engaging with the bolt.

According to Fig. 19 the ends of the guide tubes 9 are arranged around the drivers 6 each of which is provided with a tongue 45 projecting into the corresponding guide tube 9 through a slot of the latter, thus forming a stop or abutment for the balls in the guide tube for turning the driver. When the key is introduced and the bits 41 of the same enter the openings 12 of the closing disc 11 the drivers 6 are turned through different angles by the movement of the balls 10 in striking against the ends of the pivoted levers 16 (Fig. 5) or against the abutments 45 (Fig. 19) carried by the drivers themselves, the angular displacement of the latter depending on the adjustment chosen of the bits of the key, but when the key is withdrawn the said drivers 6 are brought back into their zero position by the action of the springs 21. According to Fig. 19 the springs 21 are lodged within the ends of the tubes 19 or according to the dotted line 21' in the drivers 6 as spiral springs.

The modus operandi of the novel adjustable locking device is as follows:—

When the locking device is open, viz. in its position in which the bolt 25 does not project from the casing of the lock and the plates 4 and 22 forming the tumbler are close together, the stops 2 and 5 for locking the bolt 25 (Fig. 21) being in different planes, then the drivers 6 and 26 are coupled, in pairs, the flat springs 28 being pressed back and the pins 30 withdrawn from the recesses 31. By introducing the key the drivers 26 and accordingly the drivers 26 are displaced in pairs by different amounts according to the adjustment of the bits 41. The drivers 6 and 26 being coupled by rotating the key both plates 4 and 22 are rotated, so that the bolt 25 is caused to project. The movement of the bolt 25 is determined by stops fixed in the casing of the lock and limiting the angle of deviation of the rocking arm 23 (see Fig. 13). By the beforementioned rotation of the plates 4 and 22 the stops 5 of the plate 4 have left the stops 2 in the casing of the lock. The key now being withdrawn, the plate 4 is moved back by the action of the springs 33, the drivers 6 and 26 are uncoupled and by the action of the springs 21 all drivers 6 are brought back into their zero position while the drivers 26 of the plate 22 are kept in their position by the flat springs 28 and the pins 29 so that the bolt 25 can be retracted only by means of a key the adjustment of the bits of which is exactly identical to that of the key used for projecting the bolt, as otherwise, when a key is introduced the bits 41 of which are not adjusted in exactly the same way, the drivers 6 and 26 can not be caused to register properly with one another so that the distance pieces 32 remain operative to lock the plate 4 against approach towards the plate 22. It is however indispensable that the plate 4 be approached towards the plate 22 when the bolt 25 of the lock is to be displaced.

In order that unauthorized persons may be prevented from displacing the bolt from its open position (Fig. 13) to the right with an unknown adjustment of the bits of the key, the bolt may be brought by a further turn of the authorized key into an additional open position, as for example shown by dotted lines 56 in Fig. 19, from which position the bolt 25 can be moved into the normal open position only by the introduction of the authorized key as by moving the bolt into this additional open position all parts of the lockmechanism assume a position such as they have when the locking device is locked.

The approach of the plate 4 towards the plate 22 and the engagement of the two plates 4 and 22 and of the drivers 6 and 26 respectively carried by them after the authorized key has been introduced takes place in the case of the embodiments shown in Figs. 1 to 18 and particularly Fig. 12 by a pressure exerted on a key provided with the required adjustment of the bits. By the authorized key having been introduced the openings 7 of the drivers 6 have been caused to register with the pins 32 of the plate 22 so that when the key is pushed into the locking device the pins 32 will penetrate into the holes 7, the plate 4 will approach the plate 22 against the action of the spreader spring 33 and the stops 5 mounted on the plate will be lifted off the plane of the stops 2. To this end the two plates 4 and 22 are pivotally mounted in the embodiment shown in Figs. 1 to 12 and the plate 22 is directly hinged to the bolt 25 by means of the projection 23 provided with a slot 23' and a pin 24 so that the displacement of the bolt 25 is accomplished after introduction of the authorized key and approach of the plate 4 towards the plate 22 by the key being turned and so entraining the plate 4 and the plate 22 coupled to the same in the approached position of the plate 4.

On the side 34 opposite the keyhole bushing 3 in the locking device shown in its essential parts in Fig. 12, on the hub 22' of the plate 22 there is fastened by means of a screw 35 a handle 36 having a drop latch 37 which under the action of a spring penetrates into a notch 38 of the lock housing 34. By a pressure exerted on the pin 39 the drop latch may be disengaged from the notch 38 of the housing 34 and by a subsequent turn of the handle the bolt 25 can be displaced from the inner side of the locking device e. g. mounted on a door so that in this case a key can be dispensed with. In order that the latch or pawl 37 of the handle 36 is disengaged when the locking device is unlocked by means of the authorized key, the plate 4 is provided with the pin 14 fastened thereto by means of the screw 13 which pin is displaced after the introduction of the authorized key and the subsequent approach of the plate 4 towards the plate 22 by a pressure exerted on the key and so disengages the pawl 37 against the pressure of a spring (not shown) from the notch 38 of the lock housing 34. Apart from the stops 2 and 5 the pawl 37 thus affords a further safety against unauthorized opening of the locking device from the key side as the pawl in its locking position secures the plate 22 engaging with the bolt 25 against being turned and this plate cannot be turned until the authorized key has been introduced, the plate 4 moved towards the plate 22 by the pressure exerted on the key and the disengagement of the pawl 37 therefrom resulting.

In the embodiment of the novel locking device as shown in Figs. 19 to 23 the plates 4 and 22 are secured against being turned, and for the displacement of the bolt and the rocking arm 43 engaging with the said bolt by fork and pin 55 respectively, the key is provided with a separate revoluble stem 46 with a coupling bit 47. In the embodiment shown the said coupling bit 47 of the revoluble key stem 46 comprises a web which engages with the slot 49 of the fulcrum pin 48 of the rocking arm 49 when the key is introduced into the keyhole bush 3. To this end the fulcrum pin 48 of the said rocking arm extends through the plates 4 and 22 and projects as far as approximately a central opening 50 of the disc 11 closing the guide tubes 9. The stops 2 of the rocking arm 43 and the stops 5 of the displaceable plate 4 are provided with sloped or wedge-shaped edges so that on rotating the rocking arm 43, its stops 2 will slide up to the surface of the stops 5 of the plate 4, whereby the latter is pushed forward on the bolts carrying the springs 33 a distance equal to the thickness of the stops 2. The displacement of the bolt 25 takes place in such a way that on introducing the key provided with the correctly adjusted bits the drivers 6 and 26 are brought into the registering position permitting the approach of the plate 4 towards the plate 22, and subsequently by the stem 46 provided with a knob 51 being turned, the rocking arm 43 of the bolt 25 is also turned. At the turning of the rocking arm 43 its stops 2 slide up upon the stops 5 of the plate 4, the latter being thus caused to displace in the above described manner on the bolts carrying the springs 33 and to approach to the plate 22 as shown in Fig. 21. On further turning the rocking arm its stops 2 slide down from the stops of the plate 4, so that the latter under the influence of the springs 33 is caused to return into its normal position (Fig. 20), whereby the drivers 6 and 26 of the plates 4 and 22 are uncoupled again and the distance pieces 32 of the said plates become operative as soon as the key is withdrawn so that the plates 4 and 22 and thus the stops thereof 2 and 5 are secured in their locking position.

The bushing 3 is further provided with a slot 52 which registers with a pawl 53 provided on the key when the same is in its correct position. This arrangement is intended for keeping the key in its introduced position while it is turned in order to displace the bolt, for ensuring the key being introduced into the bushing 3 in the correct angular position and for rendering possible the axial displacement of the key in case the displacement of the bolt is to be accomplished by this kind of movement. When the key is introduced the pawl enters the slot 52 of the bushing 3 and so secures the key in its introduced position until the pawl has been disengaged from the key bush by the projection 54 of the pawl 53 having been pressed down. It is obvious that the safety device may also have another shape and that besides instead of the pawl the front of the key having the effective parts 41 for locking may also carry a special pin or the like which permits the introduction of the key into the bushing 3 only in the correct angular position of the key, e. g. by entering a corresponding hole in the bushing or in the closing disc 11.

It is obvious that the invention is not restricted to the several embodiments described and illustrated but the novel adjustable locking device may be practically designed in a variety of ways in its details without departing from the spirit of the invention, as defined in the annexed claims.

What I claim and desire to secure by Letters Patent, is:—

1. A locking device to be locked by an adjustable key and to be opened with the same adjustment of the bits of the said key, comprising a bolt, a rocking arm for moving said bolt, two plates, one of said plates being movable toward or away from the other, means for locking the said bolt and rocking arm respectively when said plates are in separated position and for releasing the said bolt and rocking arm in the approached position of the said plates.

2. A locking device to be locked by an adjustable key and to be opened with the same adjustment of the bits of the said key, comprising a bolt, a rocking arm to move said bolt, a fixed plate, a plate movable toward or from said fixed plate the planes of said plates remaining substantially parallel to each other, stops provided on the said movable plate to lock the said bolt and rocking arm from movement in the distant position of the said plates and to release the said bolt and rocking arm in the approached position of the said plates, and resilient means tending to restore the distance position of the said plates.

3. A locking device to be locked by an adjustable key and to be opened with the same adjustment of the bits of the said key, comprising a bolt, a swinging plate, a rocking arm actuated by said swinging plate to move said bolt, a fixed plate, a slidable oscillatory plate movable toward or from said fixed plate the planes of said slidable and fixed plates remaining substantially parallel to each other, means provided on the said slidable and fixed plates and abutting each other in the distant position of the slidable and swinging plates to lock the said bolt and rocking arm from movement, means disposed between said slidable and swinging plates to prevent the sliding movement of the sliding plate toward said swinging plate and operable to permit such sliding movement, and resilient means for normally pressing said sliding plate away from said swinging plate.

4. A locking device of the character set forth in claim 1, comprising drivers mounted on said plates opposite one another, distance pieces provided on the drivers of one plate and adapted to be received in the respective drivers on the other plate to permit the displacement of the movable plate, said distance pieces serving to couple said drivers together in pairs when said movable plate has been moved toward the other plate.

5. A locking device of the character set forth in claim 1, and wherein one of the plates is fixed, comprising a set of drivers mounted on said fixed plate, means to secure said set of drivers against involuntary movement in the removed position of said movable plate, a second set of drivers mounted on said movable plate and adapted to be operated by the bits of the authorized key, springs to return said movable plate into the zero position and distance pieces mounted on the drivers of said fixed plate to secure said movable plate in the bolt locking position.

6. A locking device of the character set forth in claim 1 and wherein one of the plates is fixed, comprising drivers shaped as discs pivotally mounted on said plates and distance pieces in the form of pins mounted on the drivers of the said fixed plate and engaging with corresponding holes of the respective drivers of the said movable plate in the approached position of said movable plate.

7. A locking device of the character set forth in claim 1 and wherein one of the plates is fixed, comprising drivers mounted on said plates and members operatively connected to the drivers of the movable plate and transmitting to said drivers the advance of the various bits of the key used for operating the bolt mechanism.

8. A locking device of the character set forth in claim 1, comprising a handle fastened on the rear side of the lock to the hub of said fixed plate, means for coupling said handle with the bolt and the rocking arm respectively, a releasable pawl securing said handle in its normal position and means to disengage said pawl for displacing the bolt by a turn of the handle.

FERDINAND JOSEF LEJBOWICZ.